US011780304B2

(12) United States Patent
Xu

(10) Patent No.: US 11,780,304 B2
(45) Date of Patent: *Oct. 10, 2023

(54) MOUNTING SYSTEMS AND METHODS FOR TONNEAU COVERS

(71) Applicant: Cixi City Liyuan Auto Parts Co., Ltd, Cixi (CN)

(72) Inventor: Enli Xu, Cixi (CN)

(73) Assignee: Cixi City Liyuan Auto Parts Co., Ltd, Cixi (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/514,867

(22) Filed: Oct. 29, 2021

(65) Prior Publication Data

US 2022/0055462 A1 Feb. 24, 2022

Related U.S. Application Data

(63) Continuation of application No. 17/171,139, filed on Feb. 9, 2021, now Pat. No. 11,186,151.

(30) Foreign Application Priority Data

Aug. 24, 2020 (CN) ......................... 202021779077.0
Aug. 24, 2020 (CN) ......................... 202021779113.3
Aug. 24, 2020 (CN) ......................... 202021780483.9

(51) Int. Cl.
*B60J 7/10* (2006.01)
*B60P 7/04* (2006.01)

(52) U.S. Cl.
CPC ................ *B60J 7/104* (2013.01); *B60P 7/04* (2013.01)

(58) Field of Classification Search
CPC ............ B60J 7/102; B60J 7/104; B60J 7/198
(Continued)

(56) References Cited

U.S. PATENT DOCUMENTS 5,636,893 A * 6/1997 Wheatley ................ B60J 7/141 296/100.09
6,814,388 B2 11/2004 Wheatley
(Continued)

FOREIGN PATENT DOCUMENTS

CN 206703914 12/2017
CN 207374085 5/2018
(Continued)

OTHER PUBLICATIONS

U.S. Appl. No. 17/176,363 Notice of Allowance, dated Jul. 15, 2021, 17 pages.

(Continued)

*Primary Examiner* — Joseph D. Pape
(74) *Attorney, Agent, or Firm* — Quarles & Brady LLP

(57) ABSTRACT

An embodiment provides a truck cover system that includes a side rail, a cover, and a latching mechanism. The latching mechanisms include a housing attached to the cover, a latch extending through a first end of the housing and configured to engage with a bottom portion of the side rail, a cap attached to a second end of the housing, a plunger attached to the latch and having a first plunger end partially extending through an opening of the cap, an anchor element attached to the first plunger end preventing the first plunger end from entering the housing, and a spring wrapped around the plunger. When the spring is compressed, the latch may disengage with the side rail, and, when the spring is uncompressed, the latch may engage with the side rail.

19 Claims, 10 Drawing Sheets

400 402 404 406 408 410 412 414 416 418 420 422 424 426 428 430 432 434 436 438 440 442 444 446 448 450 452 454 456 458

(58) Field of Classification Search
USPC .......................... 296/100.04, 100.07, 100.16
See application file for complete search history.

(56) References Cited

U.S. PATENT DOCUMENTS

| | | | | |
|---|---|---|---|---|
| 7,188,888 | B2 | 3/2007 | Wheatley et al. | |
| 7,484,788 | B2 | 2/2009 | Calder et al. | |
| 7,604,282 | B2 | 10/2009 | Spencer et al. | |
| D620,877 | S | 8/2010 | Rusher et al. | |
| 8,061,758 | B2 | 11/2011 | Maimin et al. | |
| 8,182,021 | B2 | 5/2012 | Maimin et al. | |
| 8,585,120 | B2 | 11/2013 | Rusher et al. | |
| 8,690,224 | B2 | 8/2014 | Maimin et al. | |
| 9,045,069 | B2 * | 6/2015 | Schmeichel | B60J 7/104 |
| 9,421,850 | B2 | 8/2016 | Shi et al. | |
| 10,189,339 | B2 | 1/2019 | Williamson et al. | |
| 10,189,340 | B2 | 1/2019 | Schmeichel et al. | |
| 10,384,522 | B2 | 8/2019 | Yilma et al. | |
| 10,471,879 | B1 * | 11/2019 | Copp | B60J 7/041 |
| 10,875,391 | B2 * | 12/2020 | Facchinello | B60J 10/90 |
| 2009/0243331 | A1 * | 10/2009 | Spencer | B60P 7/0815 296/100.01 |
| 2014/0312645 | A1 * | 10/2014 | Maimin | B60J 7/141 296/100.09 |
| 2015/0123421 | A1 * | 5/2015 | Combs, II | B60J 7/198 296/100.02 |
| 2018/0111460 | A1 * | 4/2018 | Xu | B60J 7/104 |
| 2018/0118007 | A1 * | 5/2018 | Facchinello | B60J 7/198 |
| 2018/0345768 | A1 * | 12/2018 | Frederick | B60J 7/198 |

FOREIGN PATENT DOCUMENTS

| | | |
|---|---|---|
| CN | 208530247 | 2/2019 |
| CN | 208530707 | 2/2019 |
| CN | 208633713 | 3/2019 |
| CN | 208881559 | 5/2019 |
| CN | 212073636 | 4/2020 |
| CN | 210436990 | 5/2020 |
| CN | 210554111 | 5/2020 |
| CN | 210821776 | 6/2020 |

OTHER PUBLICATIONS

U.S. Appl. No. 17/176,363 Non-Final Office Action, dated Mar. 30, 2021; 13 pages.
Notice of Allowance; U.S. Appl. No. 17/171,139 ( U.S. Appl. No. 17/171,139); corresponding parent application.
IDS substitute Sheet for form 144B for U.S. Appl. No. 17/171,139 ( U.S. Appl. No. 17/171,139); corresponding parent application.
IDS or U.S. Appl. No. 17/171,139 ( U.S. Appl. No. 17/171,139); corresponding parent application.
Non Final Office Action dated Mar. 30, 2121 for U.S. Appl. No. 17/176,363 for related case.

* cited by examiner 600
602
604
606
608
610
612
614
616
618
620
622
624
626
628
630
632
634
636
638
638
638
640

MOUNTING SYSTEMS AND METHODS FOR TONNEAU COVERS

CROSS-REFERENCE TO RELATED APPLICATIONS

This application is a continuation to U.S. patent application Ser. No. 17/171,139, filed on Feb. 9, 2021, which claims the benefit of Chinese Patent Application No. CN202021779077.0, filed on Aug. 24, 2020, Chinese Patent Application No. CN202021779113.3 filed on Aug. 24, 2020, and Chinese Patent Application No. CN 202021780483.9, filed on Aug. 24, 2020, the entire contents of which are incorporated herein by reference in their entireties for all purposes.

FIELD

The present disclosure relates, in general, to methods, systems, and apparatuses for implementing a tonneau cover.

BACKGROUND

Traditionally, truck cover systems are often used to protect cargo beds of pickup trucks. Cover systems often cover all or a portion of the cargo bed of the truck such that any items stored and/or hauled in the cargo bed are protected from outside elements and theft. Many conventional cover systems are releasably latched at the tailgate to a side rail of the truck to keep the cover closed. To facilitate access to the cargo bed, the latching structure of the cover system may be easily released. Conventional latching structures for these cover systems involve many inadequacies.

Hence, there is a need for more robust and scalable solutions for implementing methods, systems, and apparatus for implementing a tonneau cover, and more particularly, to methods, systems, and apparatus for implementing a latching system for a tonneau cover.

BRIEF SUMMARY OF THE INVENTION

The present invention is directed to truck cover systems. One general aspect of certain embodiments provides a truck cover system, which includes a side rail for mounting to a side wall of a truck bed, a first connection plate disengageably coupled to and extending from the side rail, a second connection plate disengageably coupled to the first bottom surface of the first connection plate, a cover removably accoupled to the second connection plate, a connector disengageably coupled the cover to the first connection plate and the second connection plate, a latching mechanism coupled to the cover and configured to releasably engage with a second bottom surface of the second connection plate. The side rail includes a first top surface, a side surface configured as an angled surface, and a first inner surface configured substantially in parallel with the side wall of the bed of the truck. The first connection plate includes a first recess on a first bottom surface of the first connection plate and a second recess on a second top surface of the first connection plate. The second connection plate includes a first protrusion on a third top surface of the second connection plate and a third recess on the third top surface of the second connection plate. The first protrusion is positioned within the first recess in an engaged position. The connector includes a first prong and a second prong.

According to another embodiment, the first recess of the first connection plate and the first protrusion of the second connection plate are T-shaped.

According to yet another embodiment, the first prong of the connector releasably engages with the second recess of the first connection plate, and the second prong of the connector releasably engages with the third recess of the second connection plate.

According to yet another embodiment, the connector further includes a gap located above the first connection plate and below the cover. The gap causes the second connection plate to bear the weight of the cover.

According to yet another embodiment, the second connection plate further includes a second inner surface configured in parallel with the side wall of the bed of the truck, and one or more first grooves located on the second inner surface of the second connection plate.

According to yet another embodiment, the truck cover system further includes a clamp configured to clamp a second inner surface of the second connection plate and the side wall of the bed of the truck together.

According to yet another embodiment, when the cover is closed, an upper surface of the connector releasably engages with and/or snaps into a bottom surface of the cover.

Another general aspect of certain embodiments includes a truck cover system, which includes a side rail configured to be coupled to a side wall of a bed of a truck, a cover removably attached to the side rail and configured to cover the bed of the truck, and a latching mechanism. The latching mechanism includes a latch housing attached to the cover and having a first open end and a second end, a latch extending through the first open end of the latch housing and configured to releasably engage with a bottom portion of the side rail, a cap having an opening and attached to the second end of the latch housing, a plunger attached to the latch and having a first plunger end partially extending through the opening of the cap, an anchor element attached to the first plunger end of the plunger and configured to stop the first plunger end from entering the latch housing, and a spring wrapped around the plunger. A first spring end of the spring is in contact with an interior surface of the cap. When the spring is compressed, the latch disengages with the bottom portion of the side rail. When the spring is uncompressed the latch engages with the bottom portion of the side rail latching the cover in place.

According to another embodiment, the latch is attached to the plunger via a threaded connection.

According to yet another embodiment, a bottom surface of the latch is angled.

According to yet another embodiment, the anchor element includes a slot extending through the anchor element and a cord extends through the slot of the anchor element. The cord is inserted through the slot of the anchor element to create a loop and the loop is tied via one or more attachment elements. Pulling on the cord causes the plunger to move toward the cap of the housing, then causes the spring to compress, and thus cause the latch to disengage with the bottom portion of the side rail. Releasing the cord causes the plunger to move away from the cap of the housing, then causes the spring to decompress, and thus causes the latch to engage with the bottom portion of the side rail.

According to yet another embodiment, a first segment of the cord is threaded through the cover.

Yet another general aspect of certain embodiments includes a truck cover system, which includes a side rail configured to be coupled to a side wall of a bed of a truck, a first connection plate attached to and extending from the side rail, a second connection plate removably coupled to the first bottom surface of the first connection plate, a cover removably attached to the second connection plate and configured to cover the bed of the truck, a connector configured to removably couple the cover to the first connection plate and the second connection plate, and a latching mechanism attached to the cover. The side rail includes a first top surface, a side surface configured as an angled surface, and a first interior surface. The first connection plate includes a first recess on a first bottom surface of the first connection plate, and a second recess on a second top surface of the first connection plate. The second connection plate includes a first protrusion on a third top surface of the second connection plate, and a third recess on the third top surface of the second connection plate. The connector includes a first prong and a second prong.

According to another embodiment, the latching mechanism includes a latch housing attached to the cover and having a first open end and a second end, a latch extending through the first open end of the latch housing and configured to releasably engage with a bottom portion of the second connection plate, a cap having an opening and attached to the second end of the latch housing, a plunger attached to the latch and having a first plunger end partially extending through the opening of the cap, an anchor element attached to the first plunger end of the plunger and configured to stop the first plunger end from entering the latch housing, and a spring wrapped around the plunger. A first spring end of the spring is in contact with an interior surface of the cap. When the spring is compressed, the latch disengages with the bottom portion of the second connection plate. When the spring is uncompressed, the latch engages with the bottom portion of the second connection plate latching the cover in place.

According to yet another embodiment, the latching mechanism is configured to releasably engage with the bottom portion of the second connection plate. A second bottom surface of the latch is angled and the third top surface of the second connection plate is angled. Pulling on the cord causes the plunger to move toward the cap of the latch housing, causes the spring to compress, and causes the latch to disengage with the bottom portion of the second connection plate. Releasing the cord causes the plunger to move away from the cap of the latch housing, causes the spring to decompress, and causes the latch to engage with the bottom portion of the second connection plate.

According to yet another embodiment, the first prong of the connector releasably engages with the second recess of the first connection plate, and the second prong of the connector releasably engages with the third recess of the second connection plate. The connector further includes a gap located above the first connection plate and below the cover, and the gap causes the second connection plate to bear the weight of the cover.

It is to be appreciated that embodiments of the present disclosure provides many advantages over conventional techniques. Among other things, embodiments provide a truck cover system that can improve the releasable latching of the cover with the side rail. For some embodiments, the addition and operation of the plunger within the latch housing can ensure the latch properly aligns with the side rail to latch the cover in a closed position. Further, by wrapping the spring around the plunger, the spring can more effectively maintain its shape and will not deform.

The present disclosure achieves these benefits and others in the context of known technology. However, a further understanding of the nature and advantages of the present disclosure may be realized by reference to the latter portions of the specification and attached drawings.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
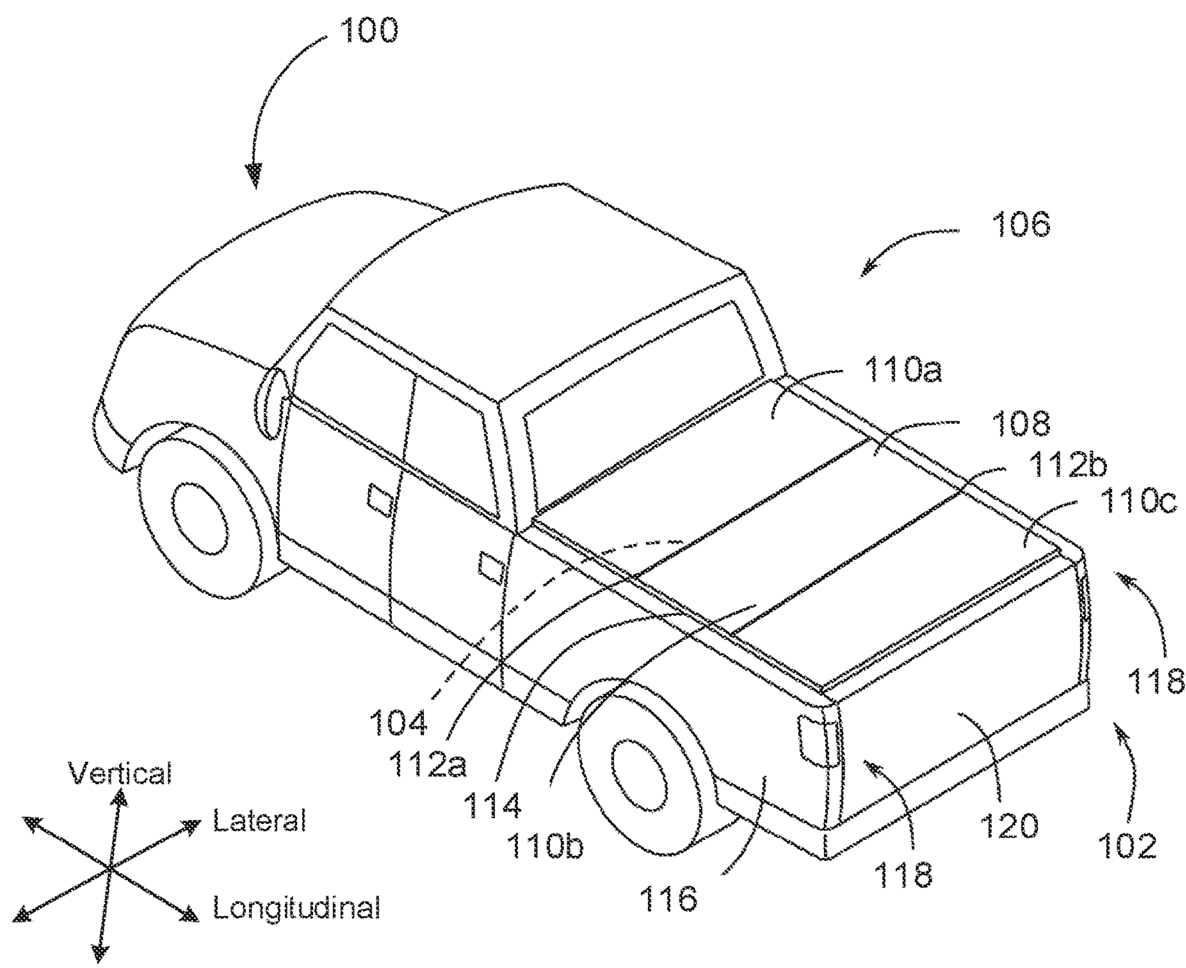
FIG. 1 is a perspective view of an embodiment of a truck with a cover system, in accordance with various embodiments.

Various embodiments provide tools and techniques for implementing a Tonneau cover, and more particularly, for implementing a latching system for a Tonneau cover.

For example, a truck cover system may be implemented. The truck cover system might include a side rail configured to be coupled to a side wall of a bed of a truck, a cover removably attached to the side rail and configured to cover the bed of the truck, and a latching mechanism. The latching mechanism might include a latch housing attached to the cover and having a first open end and a second end, a latch extending through the first open end of the latch housing and configured to releasably engage with a bottom portion of the side rail, a cap having an opening and attached to the second end of the latch housing, a plunger attached to the latch and having a first plunger end partially extending through the opening of the cap, an anchor element attached to the first plunger end of the plunger and configured to stop the first plunger end from entering the latch housing, and a spring wrapped around the plunger and attached to the plunger. A first spring end of the spring may be in contact with an interior surface of the cap. When the spring is compressed, the latch may disengage with the bottom portion of the side rail, and when the spring is uncompressed the latch may engage with the bottom portion of the side rail latching the cover in place.

Various uses or implementations may be made to the various embodiments and examples without departing from the scope of the invention. For example, while the embodiments described above refer to particular features or particular uses, the scope of this invention also includes embodiments having different combination of features or uses, and the embodiments that do not include all of the above described features.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various modifications and additions can be made to the embodiments discussed without departing from the scope of the invention. For example, while the embodiments described above refer to particular features, the scope of this invention also includes embodiments having different combination of features and embodiments that do not include all of the above-described features.

We now turn to the embodiments as illustrated by the drawings. FIGS. 1-7 illustrate some of the features of the method, system, and apparatus for implementing a Tonneau cover, and more particularly, to methods, systems, and apparatus for implementing a latching system for a Tonneau cover, as referred to above. The methods, systems, and apparatuses illustrated by FIGS. 1-7 refer to examples of different embodiments that include various components and steps, which can be considered alternatives or which can be used in conjunction with one another in the various embodiments. The description of the illustrated methods, systems, and apparatuses shown in FIGS. 1-7 is provided for purposes of illustration and should not be considered to limit the scope of the different embodiments. Further, the various components of the figures are merely illustrative and are not intended to be to scale.

With reference to the figures, FIG. 1 is a perspective view of an embodiment of a truck 100 with a truck cover system 102, in accordance with various embodiments. As illustrated, the cover system 102 covers the compartment 104 formed by a truck bed 106 to protect an interior of the truck bed 106 and items that may be stored in the compartment 104. For example, the cover system 102 may block dirt and precipitation from entering the truck bed 106.

The cover system 102 includes a cover 108 that extends over the compartment 104. The cover 108 may be flexible. The cover 108 may include one or more panels 110*a*, 110*b*, and/or 110*c*. Although three panels 110*a*, 110*b*, and/or 110*c* (collectively, panels 110) are shown in FIG. 1, the cover 108 may include more than or less than three panels 110. The cover 108 may be configured to flex or bend at the borders 112*a* and/or 112*b* of the panels 110*a*, 110*b*, and 110*c*. Additionally and/or alternatively, the cover 108 may be configured to bend or flex at locations other than the borders 112*a* and/or 112*b*. The cover 108 may be made out of a variety of materials including fabric, plastic (e.g., vinyl), rubber, etc.

The cover 108 couples to the truck bed 106 with side rails 114 that in turn couple to truck side walls 116 (e.g., truck bed walls). To block removal of the cover 108 and/or access to the truck bed 106, the cover system 102 includes one or more latch mechanisms (not shown in FIG. 1). Arrows 118 indicate one or more possible locations for the one or more latch mechanisms. For example, the cover system 102 may include two latch mechanism one at each corner of the truck bed 106 next to the tailgate 120. In operation, the latch systems couple to the side rails 114 to tension/pull the cover 108 into an extended position (e.g., tensioned configuration) that facilitates the flow of precipitation off of the cover system 102 as well as enhancing the aesthetic appearance of the cover system 102.

Figure 2:
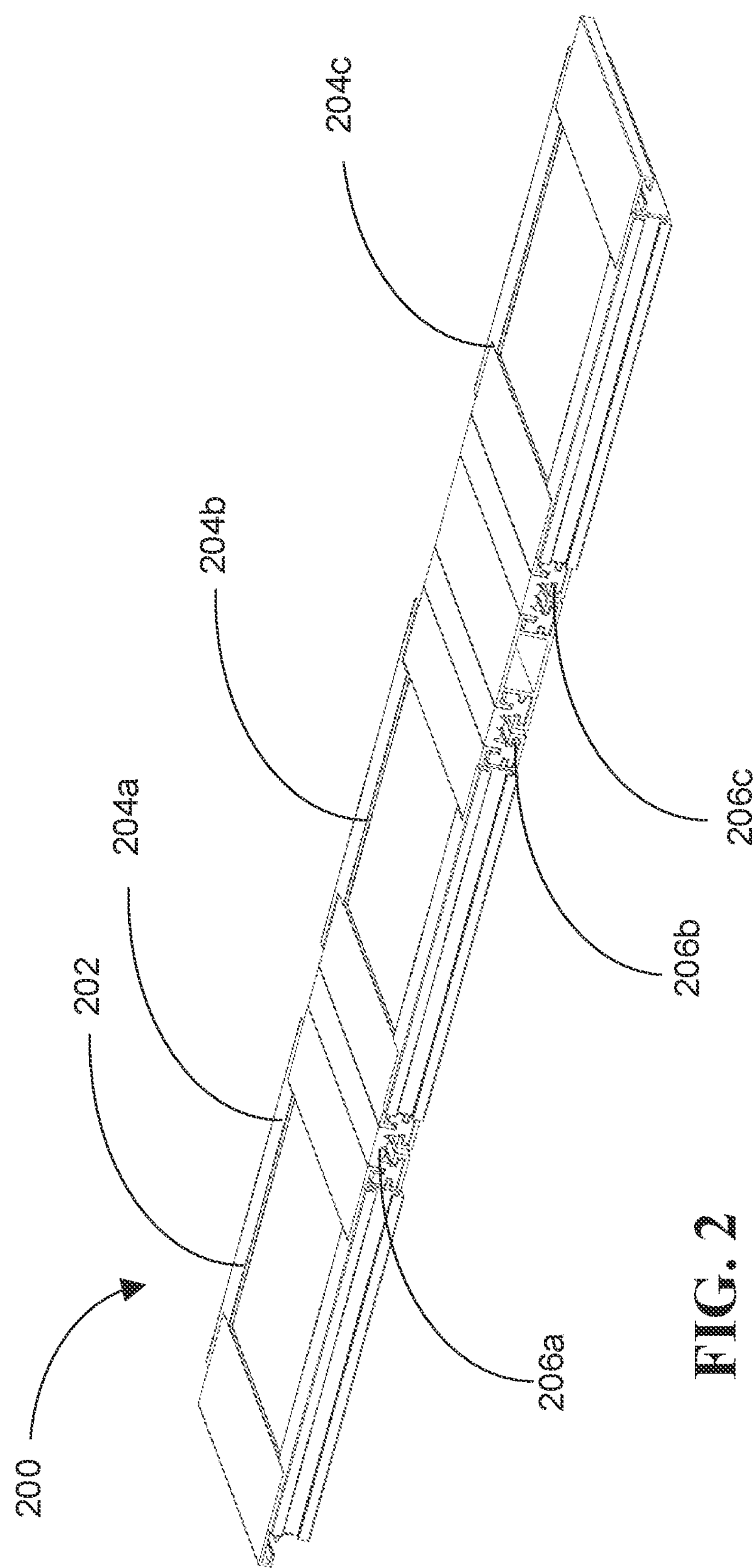
FIG. 2 is a perspective view of a cover system 200, in accordance with various embodiments.

FIG. 2 is a perspective view of a cover system 200, in accordance with various embodiments. The cover system 200 may be similar to the cover system 102 shown in FIG. 1.

Cover system 200 may comprise a cover 202 including one or more panels 204*a*, 204*b*, and/or 204*c* (collectively, panels 204). The one or more panels 204 may be formed from a flexible material. The flexible material may include fabric, plastic (e.g., vinyl), rubber, etc. Although three panels 204 are shown in FIG. 2, the cover 200 may include more than or less than three panels.

The one or more panels 204 may connected to each other via one or more hinges 206*a*, 206*b*, and/or 206*c* (collectively, hinges 206). The hinges 206 may be formed from a flexible material. The flexible material may include fabric, plastic (e.g., vinyl), rubber, etc. The cover 202 may be configured to bend at the one or more hinges 206. In a non-limiting example, a user may bend the cover 202 and the one or more hinges 206 to access the bed of the truck.

Figure 3A:
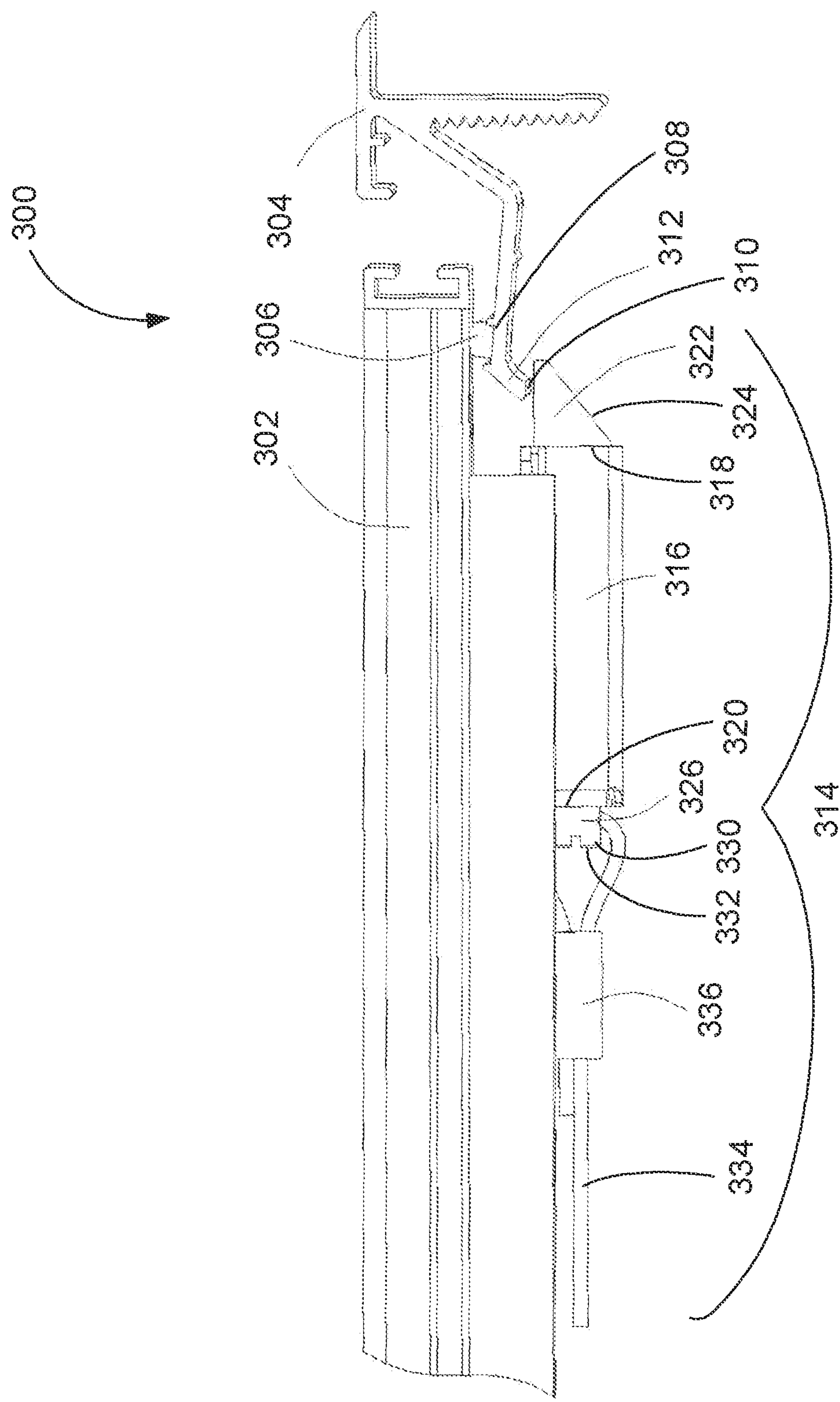
FIG. 3A is a partial front view of a cover system with a latching mechanism, in accordance with various embodiments.
Figure 3B:
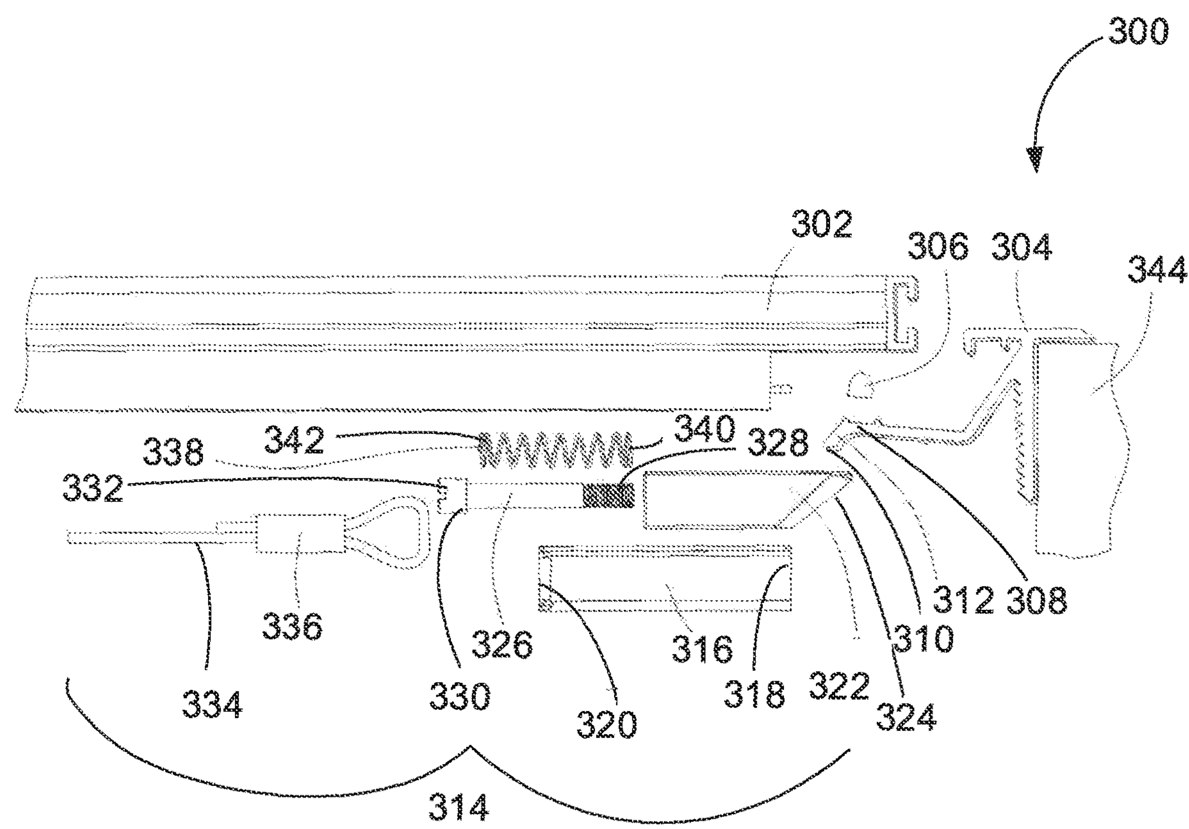
FIG. 3B is an exploded view of the cover system with the latching mechanism from FIG. 3A, in accordance with various embodiments.

FIG. 3A is a partial front view of a cover system 300 with a latching mechanism 314, in accordance with various embodiments. FIG. 3B is an exploded view of the cover system 300 with the latching mechanism 314 from FIG. 3A, in accordance with various embodiments. The cover system 300 may be similar to the cover system 102 shown in FIG. 1 and/or the cover system 200 shown in FIG. 2.

The cover system 300 might include a cover 302 and a side rail 304. The cover 302 might cover a bed of a truck and protect the bed of the truck. The cover 302 might include a connector 306 attached to the cover 302. The side rail 304 might be coupled to a side wall 344 of the bed of the truck. The side rail 304 might include a recess 308, a bottom portion and/or surface 310, and a sloped and/or angled end surface 312.

The connector 306 might releasably and/or removably attach the cover 302 to the side rail 304. The connector 306 might be received in the recess 308 of the side rail 304. The connector 306 might snap into the recess 308 when the cover 302 is closed and might snap out of the recess 308 when the cover 302 is opened. The connector 306 might be formed from a flexible material that has the ability to bend with the cover 302. The flexible material might include fabric, plastic (e.g., vinyl), rubber, etc.

The cover system 300 might further include a latching mechanism 314. The latching mechanism 314 might be located on one side of the truck bed. Additionally and/or alternatively, there may be two latching mechanisms 314 located on each side of the truck bed.

The latching mechanism 314 might include a latch housing 316 attached to the cover 302. The latch housing 316 might have a first open end 318 and a second end 320. The latching mechanism 314 might further include a latch 322 extending through the first open end 318 of the latch housing 316. The latch 322 might be configured to releasably engage with a bottom portion 310 of the side rail 304. The latch 322 might have a sloped and/or angled surface 324.

In some cases, the second end 320 of the housing 316 might have a smaller open end than the first open end 318 of the housing 316. The latching mechanism 314 might further comprise a cap (not shown) restricting the second end 320 of the housing. The cap may have an opening that is smaller than the first open end 318 of the latch housing 316.

The latching mechanism 314 might additionally include a plunger 326 attached to the latch 322. The plunger 326 might be attached to the latch 322 via a threaded connection 328. A first plunger end 330 might partially extend through an opening of the cap. An anchor element 332 might be attached to the first plunger end 330 of the plunger 326 and might be configured to stop the first plunger end 330 from entering the latch housing 316 through the opening of the cap.

A cord 334 might loop and extend through a slot of the first plunger end 330 and/or anchor element 332. Two ends of the looped cord 334 might be attached together via one or more attachment mechanisms 336.

The latching mechanism 314 might also include a spring 338. The spring 338 might be wrapped around the plunger 326. In some cases, a first end 340 of the spring 338 might be attached to the plunger 326. A second end 342 of the spring may be in contact with an interior surface of the second end 320 of the housing 316 and/or an interior surface of the cap.

In operation, in order to open the cover 302, a user of the cover 302 may pull the cord 334 which pulls the plunger 326 further out of the second end 320 of the housing 316 and/or out of the opening of the cap, compresses the spring 338, and pulls the latch 322 into the open end 318 of the housing 316 causing the latch 322 to disengage with the bottom surface 310 of the side rail 304. In order to close the cover 302, the user of the cover 302 may push the cover down causing the connector 306 to releasably engage with the recess 308, causing the sloped surface 324 of the latch 322 to slide along the sloped surface 312 of the side rail 304, pushing the latch 322 toward the second end of the housing 320, and compressing the spring 338. Once the sloped surface 324 of the latch 322 clears the sloped surface 312 of the side rail 304, the spring uncompresses pushing the latch 322 outward and away from the second end of the housing 320 and enabling the latch 322 to releasably engage with the bottom surface 310 of the side rail 304.

The latching mechanism 314 will further be described below with respect to FIGS. 6 and 7.

Figure 4A:
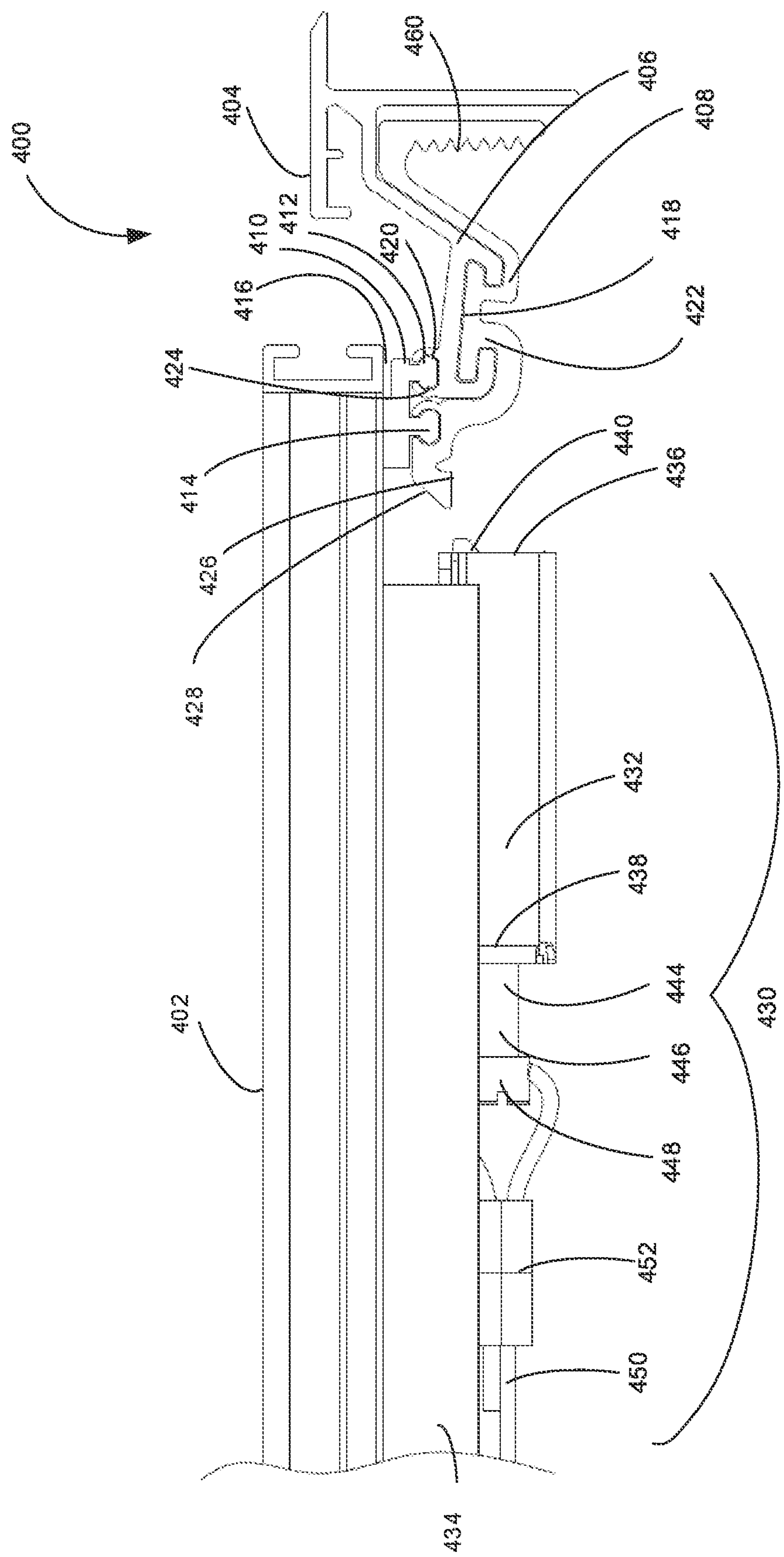
FIG. 4A is a partial front view of a cover system with a latching mechanism in an unlocked position, in accordance with various embodiments.
Figure 4B:
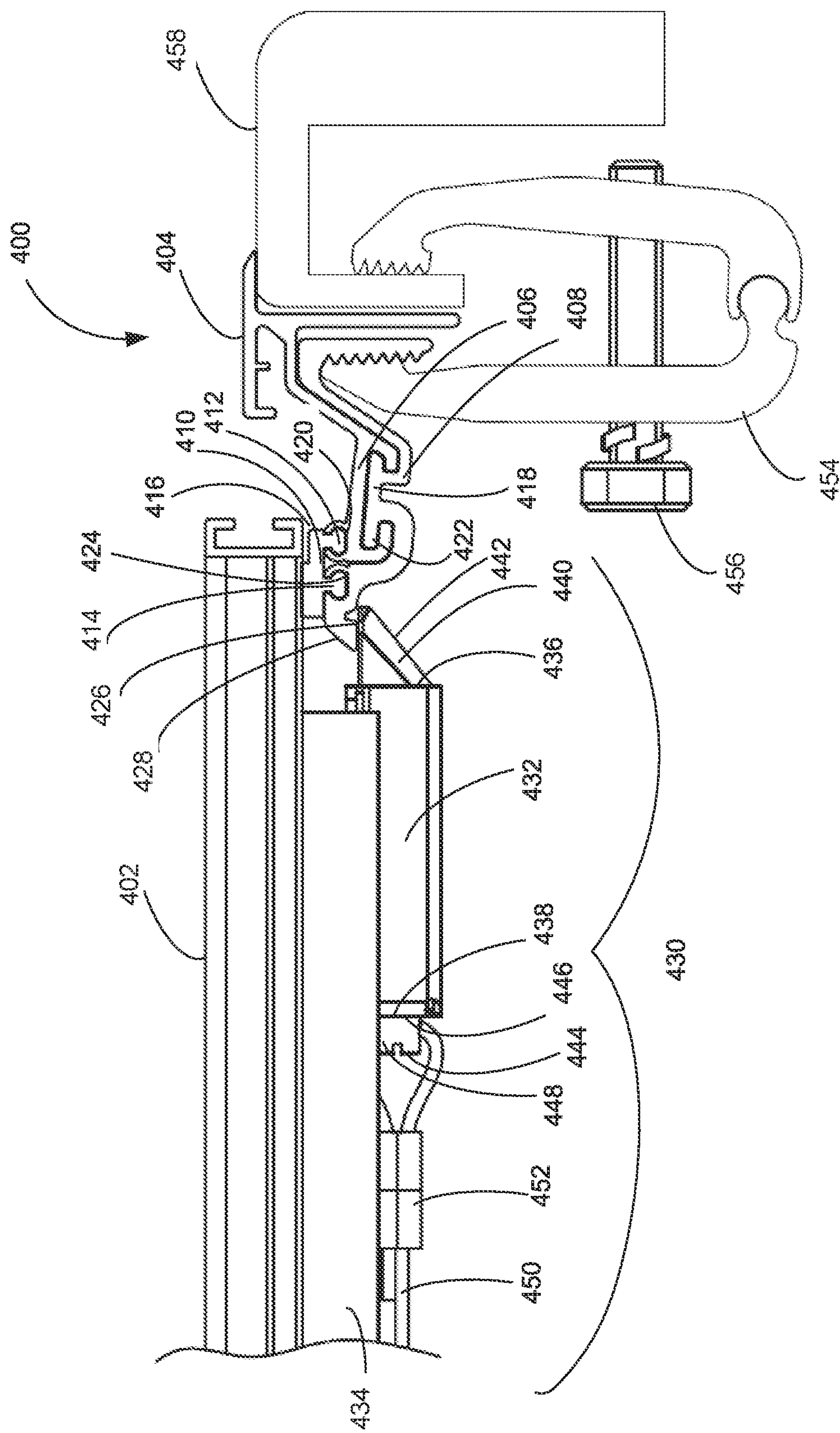
FIG. 4B is a partial front view of a cover system with a latching mechanism in a locked position, in accordance with various embodiments.
Figure 4C:
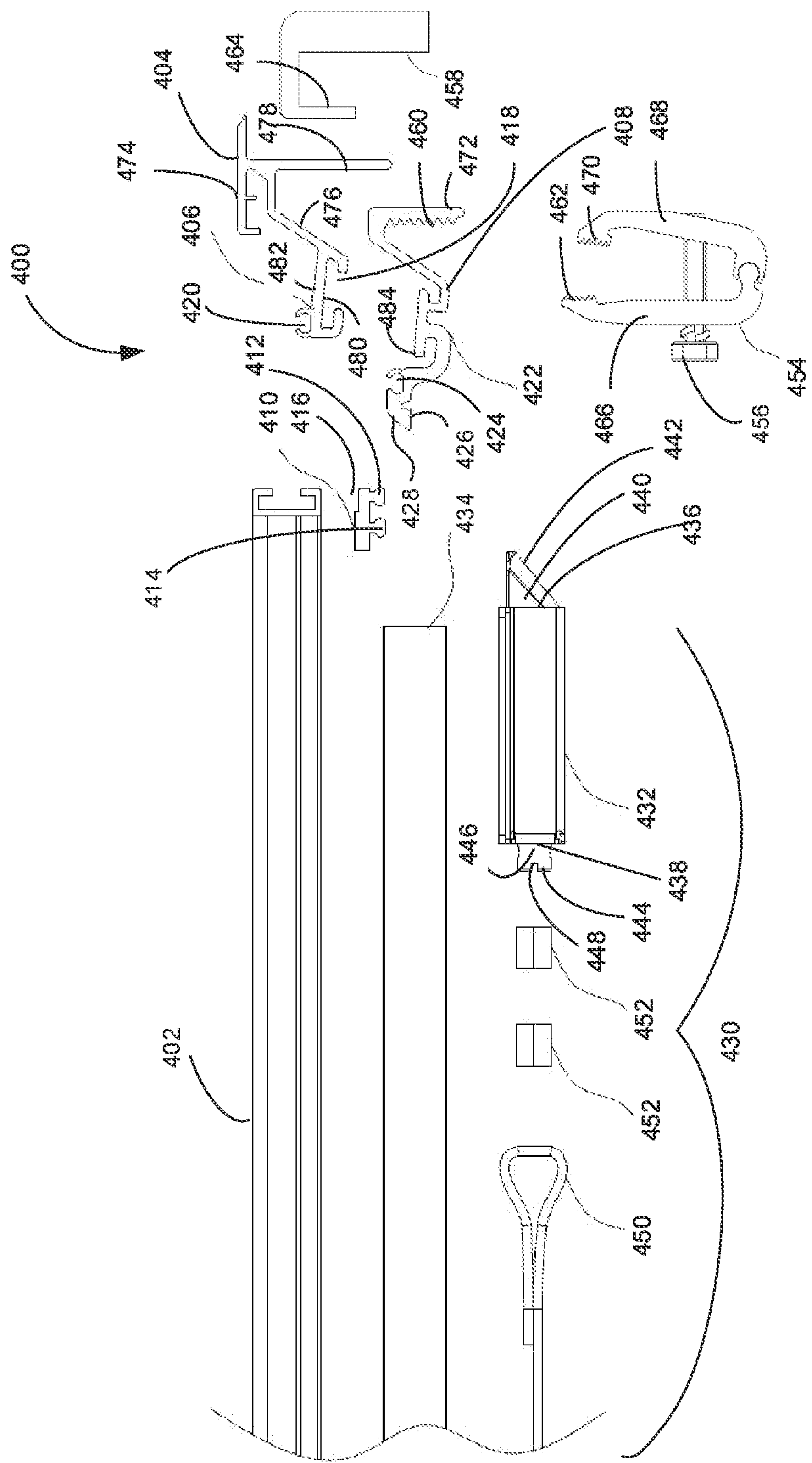
FIG. 4C is an exploded view of the cover system with the latching mechanism from FIGS. 4A and 4B, in accordance with various embodiments.

FIG. 4A is a partial front view of a cover system 400 with a latching mechanism 430 in an unlocked position, in accordance with various embodiments. FIG. 4B is a partial front view of a cover system 400 with a latching mechanism 430 in a locked position, in accordance with various embodiments. FIG. 4C is an exploded view of the cover system 400 with the latching mechanism 430 from FIGS. 4A and 4B. The cover system 400 may be similar to the cover system 102 shown in FIG. 1 and/or the cover system 200 shown in FIG. 2.

The cover system 400 might include a cover 402, a side rail 404 having a first connection plate 406 disengageably couple to and extending from the side rail 404, a second connection plate 408, and an optional clamp 454. The cover 402 might cover a bed of a truck and protect the bed of the truck. The cover 402 might include a connector 410 attached to the cover 402. The connector 410 might include a first prong 412, a second prong 414, and a gap 416 extending over first prong 412. The side rail 404 might be coupled to a side wall 464 of the bed of the truck 458. The side rail 404 might include a first top surface 474, a side surface 476, and a first inner surface 478. The side surface 476 of the side rail 404 might be configured as an angled surface to enhance the stability of the truck cover system 400. The first inner surface 478 of the side rail 404 might be configured substantially in parallel with the side wall 464 of the bed of the truck 458. The first connection plate 406 of the side rail 404 might include a first recess 418 and a second recess 420. The first recess 418 of the first connection plate 406 might be located on a first bottom surface 480 of the first connection plate 406. The second recess 420 might be located on a second top surface 482 of the first connection plate 406. The second connection plate 408 might disengageably couple to the first bottom surface 480 of the first connection plate 406. The second connection plate 408 might include a first protrusion 422, a third recess 424, a second bottom surface 426, and/or a sloped and/or angled end surface 428. The second connection plate might comprise a third top surface 484. The third recess 424 might be located on the third top surface 484 of the second connection plate 408. When the first connection plate 406 and the second connection plate 408 are in an engaged position, the first protrusion 422 of the second connection plate 408 might be positioned within the first recess 418 of the first connection plate 406. In some embodiments, the third top surface 484 of the second connection plate 408 might be angled in order to facilitate the flow of precipitation. The cover 402 might be removably coupled to the second connection plate 408.

The second connection plate 408 might further include one or more first grooves 460 that defines a series of protrusions and recesses. The first grooves 460 might be located on a second inner surface 472 of the second connection plate 408. The second inner surface 472 of the second connection plate 408 might be removably in parallel with the side wall 464 of the bed of the truck 458. The clamp 454 might include a first clamp frame 466 and a second clamp frame 468 that couple together using a fastener 456. The fastener 456 might be a bolt, a screw, and/or the like. In some embodiments, the clamp frames 466, 468 might together form a C-shaped clamp 454. The first clamp frame 466 might include one or more second grooves 462. The second clamp frame 468 might include one or more third grooves 470. The clamp 454 might be configured to removably clamp the second inner surface 472 of the second connection plate 408 and the side wall 464 of the truck bed 458 together. For example, the clamp 454 might be removably attached to a portion of the second connection plate 408, such as the second inner surface 472. The clamp 454 might also be removably attached to a portion of the side wall 464 of the truck bed 458.

In some embodiments, the first grooves 460 of the second connection plate 408 might be configured to align and/or mate with the second grooves 462 of the first clamp frame 466. The third grooves 470 might be removably coupled to the side wall 464 of the bed of the truck 458. The first grooves 460 of the second connection plate 408 enable attachment of the second connection plate 408 to the side wall 464 of the truck bed 458 using the clamp 454. The second grooves 462 of the first clamp frame 466 might removably engage with the first grooves 460 of the second connection plate 408. The third grooves 470 of the second clamp frame 468 might removably couple to the side wall 464 of the truck bed 458. According to some embodiments, the first grooves 460, second grooves 462, and/or the third grooves 470 might be of a different size or a same size in order to facilitate orientation and coupling of the clamp frames 466, 468 during installation in various applications. In a non-limiting example, the first grooves 460 and second grooves 462 may be a first size to facilitate orientation and coupling between the second connection plate 408 and the first clamp frame 466 and the third grooves 470 may be a second different size to facilitate orientation and coupling between the second clamp frame 468 and the side wall 464 of the truck bed 458.

In operation, the second connection plate 408 might slidingly engage with and releasably attach to the first connection plate 406. In order to facilitate this connection, the first protrusion 422 of the second connection plate 408 might slidingly engage with and releasably attach to the first recess 418 of the first connection plate 406. In some cases, the first protrusion 422 and the first recess 418 might be T-shaped. In operation, the first grooves 460 of the second connection plate 408 might align with the second grooves 462 of the first clamp frame 466, the fastener 456 might compress the first clamp frame 466 and the second clamp frame 468 together to compressively hold the second connection plate 408 and side rail 404 against the side wall 464 of the truck bed 458.

Additionally, the connector 410 might disengageably and/or removably attach the cover 402 to both the first connection plate 406 of the side rail 404 and the second connection plate 408. When the cover 402 is closed, the first prong 412 might releasably engage with and/or snap into a second recess 420 of the first connection plate 406, the second prong 414 might releasably engage with and/or snap into the third recess 424 of the second connection plate 408, and an upper surface of the connector 410 might deform against the cover 402. In other embodiments, when the cover 402 is closed, an upper surface of the connector 410 might releasably engage with and/or snap into a bottom surface of the cover 402. When the cover 402 is opened, the first prong 412 might snap out of the second recess 420 of the first connection plate 406 and the second prong 414 might snap out of the third recess 424 of the second connection plate 408. In other embodiments, when the cover 402 is opened, the first prong 412 might stay engaged with the recess 420 of the first connection plate 406, the second prong 414 might stay engaged with the third recess 424, and an upper surface of the connector 410 might disengage with a bottom surface of the cover 402. In some cases, the connector 410 might extend along the total length of the cover. The connector 410 might be formed from a flexible material that has the ability to bend with the cover 402. The first prong 412 and the second prong 414 may also be formed from a flexible material that has the ability to deform to releasably engage with and/or snap into the second recess 420 and the third recess 424. The flexible material of the connector 410, the first prong 412, and/or the second prong 414 might include fabric, plastic (e.g., vinyl), rubber, etc. The connector 410 might be configured to block precipitation and reduce the wear-and-tear of the truck cover 402.

In some embodiments, the gap 416 extending over first prong 412 and the first connection plate 408 causes the weight of the cover 402 to be held second connection plate 408. In other words, the force from the cover 408 pushes the second connection plate 408 downward. This causes the second connection plate 408 to distribute the force from the cover 402 to the first connection plate 406 via a pulling force instead of a pushing force. In other words, the second connection plate 408 pulls the first connection plate 408 and the side rail 404 downward. Advantageously, by distributing the force from the cover 402 in this manner, the side rail 404 is more securely held in place against the side wall of the truck bed, and, thus, the optional clamp 454 does not need to exert much force to couple the second connection plate 408 and the side rail 404 to the sidewall 464 of the truck bed 458. The optional clamp 454 merely serves as a backup to couple the side rail 404 to the sidewall 464 of the truck bed 458.

The cover system 400 might further include a latching mechanism 430. The latching mechanism 430 might be located on one side of the truck bed. The latching mechanism 430 might be coupled to the cover 402 and configured to releasably engage with the second connection plate 408. Additionally and/or alternatively, there may be two latching mechanisms 430 located on each side of the truck bed.

The latching mechanism 430 might include a latch housing 432 attached to the cover 402 via a latch attachment 434. The latch housing 432 might have a first open end 436 and a second end 438. The latching mechanism 430 might further include a latch 440 extending through the first open end 436 of the latch housing 432. The latch 440 might be configured to releasably engage with the second bottom surface 426 of the second connection plate 408. The latch 440 might have a sloped and/or angled surface and/or third bottom surface 442.

In some cases, the second end 438 of the latch housing 432 might have a smaller open end than the first open end 436 of the latch housing 432. The latching mechanism 430 might further comprise a cap (not shown) restricting the second end 438 of the latch housing 432. The cap may have an opening that is smaller than the first open end 436 of the latch housing 432.

The latching mechanism 430 might additionally include a plunger 444 attached to the latch 440. The plunger 444 might be attached to the latch 440 via a threaded connection (not shown). A first plunger end 446 might partially extend through an opening of the cap. The anchor element 448 might be attached to the first plunger end 446 of the plunger 444 and might be configured to stop the first plunger end 446 from entering the latch housing 432.

A cord 450 might loop and extend through a slot of the first plunger end 438 and/or anchor element 448. Two ends of the looped cord 450 might be attached together via one or more attachment mechanisms 452.

The latching mechanism 430 might also include a spring (not shown). The spring might be wrapped around the plunger 444. In some cases, a first end of the spring might be attached to the plunger 444. A second end of the spring may be in contact with an interior surface of the second end 438 of the housing 432 and/or an interior surface of the cap.

In operation, in order to open the cover 402, a user of the cover 402 may pull the cord 450 which pulls the plunger 444 further out of the second end 438 of the housing 432 and/or out of the opening of the cap, compresses the spring, and pulls the latch 440 into the open end 436 of the housing 432 causing the latch 440 to disengage with the second bottom surface 426 of the second connection plate 408. FIG. 4B shows the latch 440 in a locked position. In order to close the cover 402, the user of the cover 402 may push the cover 402 down causing the first prong 412 and the second prong 414 of the connector 410 to releasably engage with the second recess 420 of the first connection plate 406 and the third recess 424 of the second connection plate 408, respectively, causing the sloped surface 442 of the latch 440 to slide along the sloped surface 428 of the second connection plate 408, pushing the latch 440 toward the second end 438 of the housing 432, and compressing the spring. Once the sloped surface 442 of the latch 440 clears the sloped surface 428 of the second connection plate 408, the spring uncompresses pushing the latch 440 outward and away from the second end 438 of the housing 432 and enabling the latch 440 to releasably engage with the second bottom surface 426 of the second connection plate 408. FIG. 4A shows the latch 440 in an unlocked position.

The latching mechanism 430 will further be described below with respect to FIGS. 5, 6, and 7 below.

Figure 5:
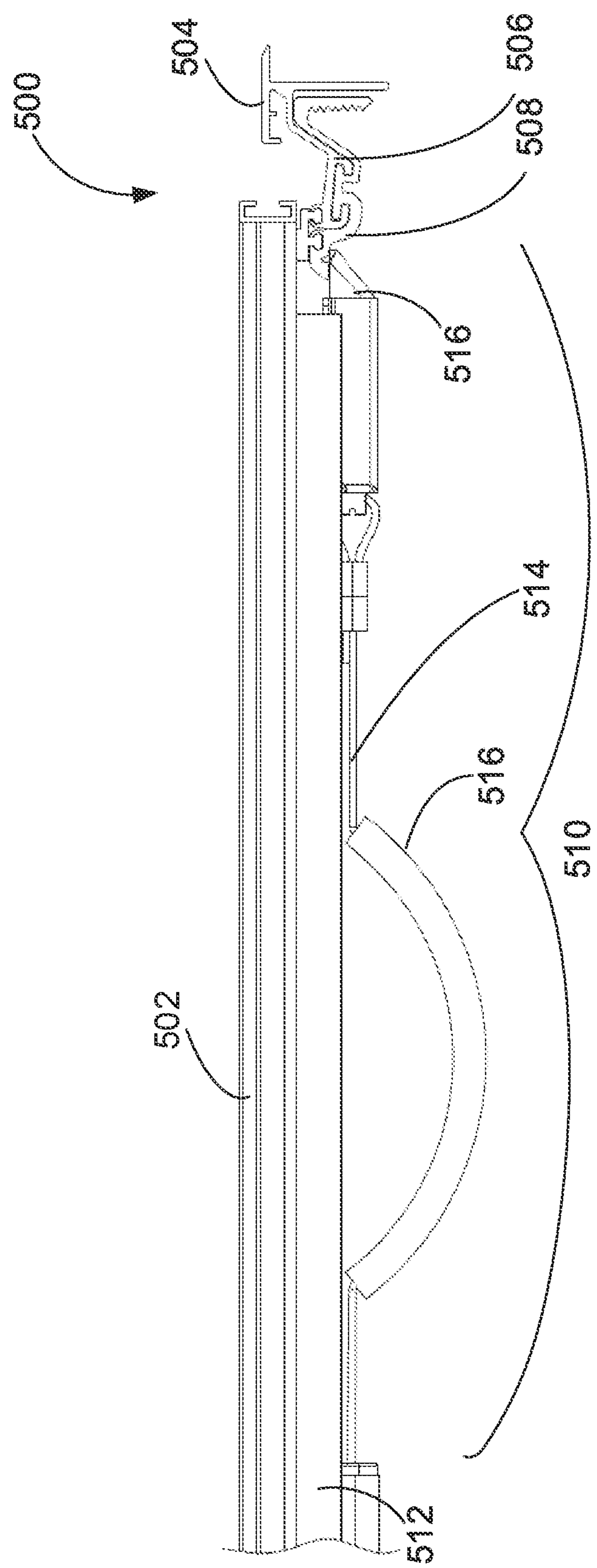
FIG. 5 is a partial front view of a cover system with a latching mechanism from FIG. 4, in accordance with various embodiments.

FIG. 5 is a partial front view of a cover system 500 with a latching mechanism 510 from FIGS. 4A, 4B, and 4C, in accordance with various embodiments. The cover system 500 functions in a similar manner as the cover system 400 from FIG. 4. Additionally and/or alternatively, some of the functionalities described below with respect to FIG. 5 may also be applied to the cover system 300 of FIG. 3.

The cover system 500 might include a cover 502, a side rail 504 having a first connection plate 506, a second connection plate 508 coupled to the first connection plate 506, and a latching mechanism 510 coupled to the cover 502 via a latch attachment 512.

In some cases, the latching mechanism 510 might have a cord 514 attached to a latch 516 of the latching mechanism 510. A first segment of the cord 514 may be threaded through the cover 502 and/or the latch attachment 512. In various embodiments, one or more portions of the first segment of the cord 514 might be looped to form one or more handles 516. In some cases, the one or more portions of the first segment of the cord might extend out of the cover 502 and/or the latch attachment 512 to form the one or more handles 516. The cord 514 may be encased in fabric, plastic, rubber, and/or the like to form the one or more handles. A user might pull the one or more handles 516 to disengage the latch 516 from a bottom surface of the second connection plate 508. In this manner, a user can advantageously disengage the latch 516 from the second connection plate 508 and open the cover 502.

In various instances, the one or more handles 516 are only accessible to a user when a tailgate of the truck is open. Thus, items inside the bed of the truck may be protected from theft because the bed on the truck is only accessible when the tailgate of the truck is opened.

The latching mechanism 510 will further be described below with respect to FIGS. 6 and 7 below.

Figure 6:
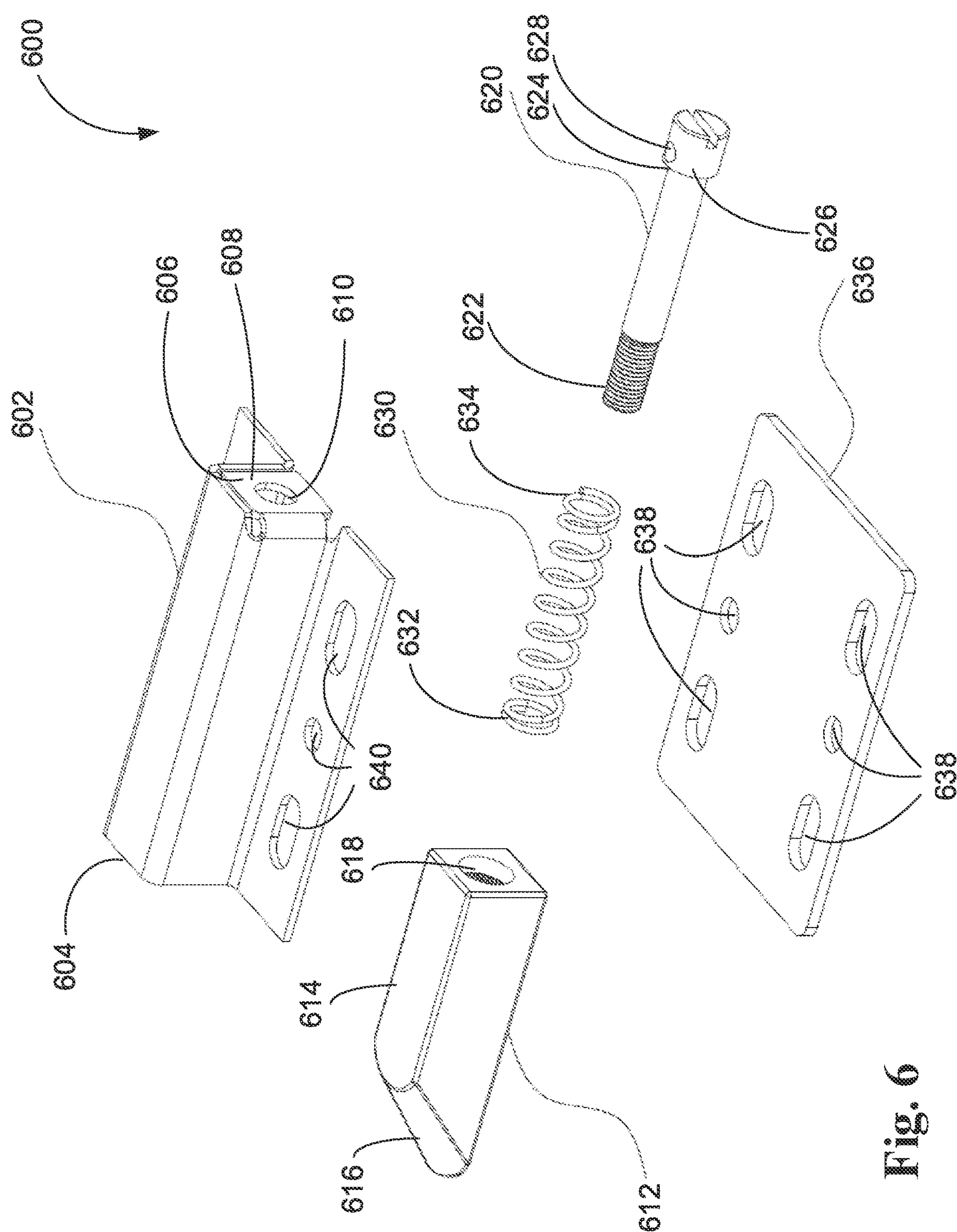
FIG. 6 is an exploded view of a latching mechanism from FIGS. 3, 4, and 5, in accordance with various embodiments.

FIG. 6 is an exploded view of a latching mechanism 600 from FIGS. 3, 4, and 5, in accordance with various embodiments. The latching mechanism 600 may be similar to latching mechanism 314 of FIG. 3, latching mechanism 430 of FIG. 4, and/or latching mechanism 510 of FIG. 5.

The latching mechanism 600 might include a latch housing 602. The latch housing 602 might have a first open end 604 and a second end 606. The first open end 604 may have a square shaped opening. The second end 606 might comprise a cap 608. In some cases, the cap 608 might be machined and be integral with housing 602. In other cases, the cap 608 might be separate from the housing 602. The cap 608 might include an opening 610. The opening 610 may be a circular opening. The second end 606 of the housing 602 might have a smaller open end than the first open end 604 of the housing 602.

The latching mechanism 600 might further include a latch 612 extending through the first open end 604 of the latch housing 602. The latch 612 might be configured to releasably engage with a bottom portion of a side rail of a cover system. The latch 612 might fit snugly within the latch housing 602 and slidingly engage with latch housing 602.

In some instances, the latch 612 might comprise a square shaped portion 614, a sloped and/or angled surface 616, and a circular recess 618. The square shaped portion 614 of the latch 612 might be mostly or fully contained within the latch housing 602. The length of the square shaped portion 614 of the latch 612 may be less than the length of the housing 602. The sloped and/or angled surface 612 might extend from the latch housing 602 and slidingly engage with a sloped surface of a side rail of a cover. Additionally and/or alternatively, a bottom portion (not shown) of the latch 612 might releasably engage with a bottom surface of the side rail when the latch 612 is in a locked position. The circular recess 618 of the latch 612 might comprise one or more threads.

The latching mechanism 600 might additionally include a plunger 620 which may be attached to the latch 612. The plunger 620 might have a first end 622 comprising one or more threads. The first end 622 of the plunger 620 might be inserted into the circular recess 618 of the latch 612 and attached to the latch 612 via a threaded connection.

In some embodiments, the plunger 620 might further include a second plunger end 624. The second plunger end 624 might partially extend through the opening 610 of the cap 608 of the latch housing 602. An anchor element 626 might be attached to the second plunger end 624 of the plunger 620. In some cases, the anchor element 626 might be attached to the first plunger end 624 via a threaded connection. The anchor element 626 might have a circular shape which may be bigger than the circular opening 610 of the cap 608. Thus, the anchor element 626 might be configured to stop or prevent the first plunger end 624 from entering the latch housing 602. The anchor element 626 might further comprise a slot 628. A cord (not shown) might loop and extend through the slot 628 of the anchor element 624.

The latching mechanism 600 might also include a spring 630. The spring 630 might be wrapped around the plunger 620. In some cases, a first end 632 of the spring 630 might be attached to the plunger 620. A second end 634 of the spring 630 may be in contact with an interior surface of the second end 606 of the housing 602 and/or an interior surface of the cap 608.

The latching mechanism 600 might further include a latch attachment 636. The latch attachment 636 might be configured to attach the latch housing 602 to a cover of a truck bed. The latch attachment 636 might comprise one or more openings 638 that are configured to match one or more openings 640 of the latch housing 602. One or more bolts or screws may be inserted through the one or more openings 638 and 640 to couple the latch housing 602 to the latch attachment 634.

In operation, in order to open a cover, the anchor element 626 may be pulled which pulls the plunger 620 further out of the second end 606 of the housing 602 through the opening 610 of the cap 608, compresses the spring 630, and pulls the latch 612 into the open end 604 of the housing 602. This causes the latch 612 to disengage with a bottom surface of a side rail of a cover system. In order to close a cover, the latch 612 may be pushed down, causing the sloped surface 616 of the latch 612 to slide along a sloped surface of a side rail, pushing the latch 612 toward the second end 606 of the housing 602, compressing the spring 630, and pushing the plunger 620 further out of the opening 610 of the cap 608. Once the sloped surface 616 of the latch 612 clears the sloped surface of a side rail, the spring 630 uncompresses pushing the latch 612 outward and away from the second end 606 of the housing 602 and enabling the latch 612 to releasably engage with a bottom surface of the side rail.

The latching mechanism 600 will further be described below with respect to FIG. 7 below.

Figure 7:
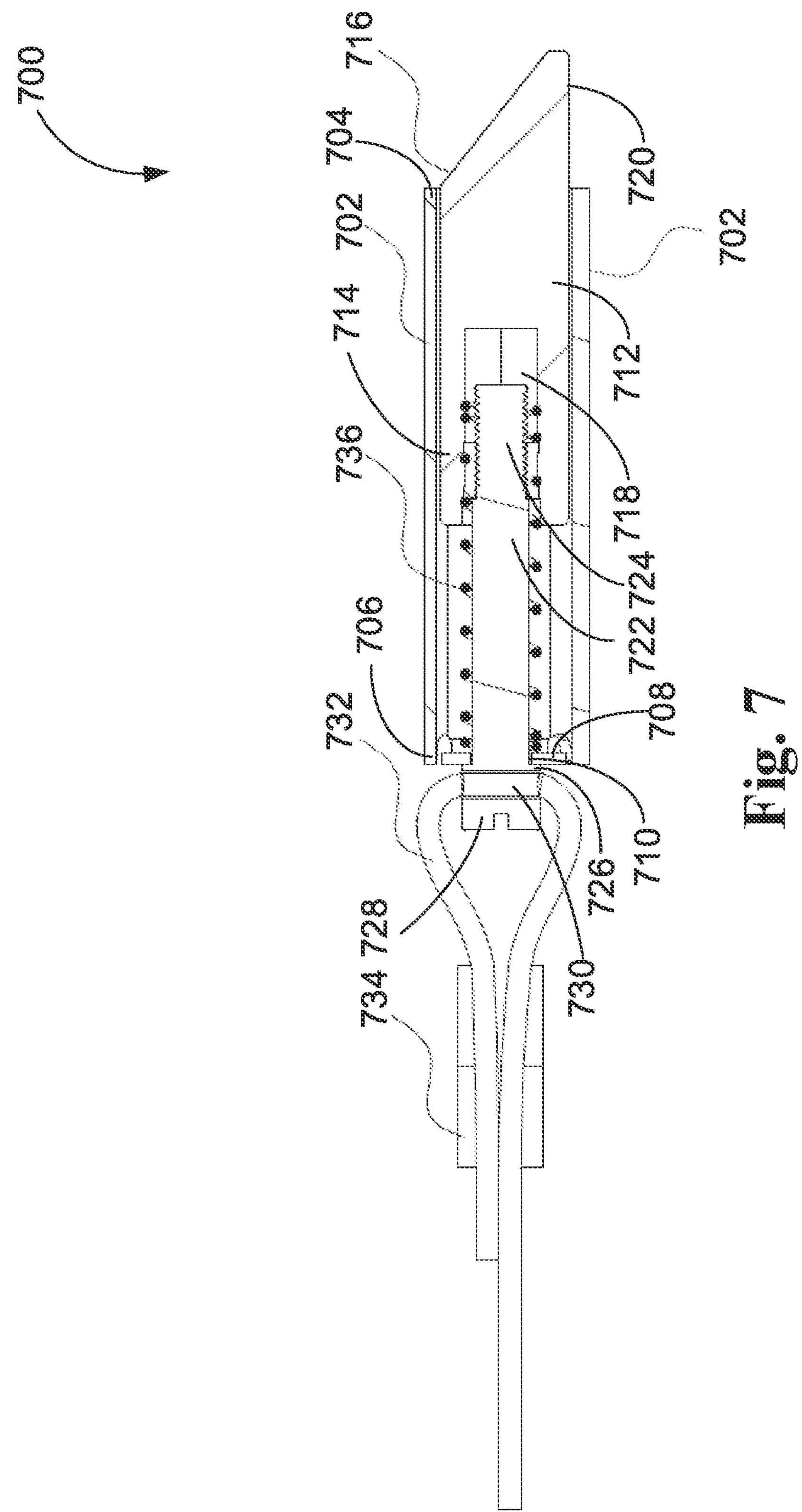
FIG. 7 is a sectional view of an interior of a latching mechanism from FIGS. 3, 4, 5, and 6, in accordance with various embodiments.

FIG. 7 is a sectional view of an interior of a latching mechanism 700 from FIGS. 3, 4, 5, and 6, in accordance with various embodiments. The latching mechanism 700 may be similar to latching mechanism 314 of FIG. 3, latching mechanism 430 of FIG. 4, latching mechanism 510 of FIG. 5, and/or latching mechanism 600 of FIG. 6.

The latching mechanism 700 might include a latch housing 702. The latch housing 702 might have a first open end 704 and a second end 706. The first open end 704 may have a square shaped and/or rectangular shaped opening. The second end 706 might comprise a cap 708. The cap 708 might include an opening 710. The second end 706 of the housing 702 might have a smaller open end than the first open end 704 of the housing 702.

The latching mechanism 700 might further include a latch 712 partially extending through the first open end 704 of the latch housing 702. The latch 712 might be configured to releasably engage with a bottom portion of a side rail of a cover system. The latch 712 might fit snugly within the latch housing 702 and slidingly engage with latch housing 702. In other words, the latch 712 might be configured to slide in and out of the latch housing 702.

In some instances, the latch 712 might comprise a square shaped and/or rectangular shaped portion 714, a sloped and/or angled surface 716, and a circular recess 718. The square shaped portion 614 of the latch 712 might be mostly or fully contained within the latch housing 702. The length of the square shaped portion 714 of the latch 712 may be less than the length of the housing 702. The sloped and/or angled surface 712 might extend from the latch housing 702 and a bottom portion 720 of the latch 712 might releasably engage with a bottom surface of a side rail of a cover when the latch 712 is in a locked position. The circular recess 718 of the latch 712 might comprise one or more threads.

The latching mechanism 700 might additionally include a plunger 722 which may be attached to the latch 712. The plunger 722 might have a first end 724 comprising one or more threads. The first end 724 of the plunger 722 might be inserted into the circular recess 718 of the latch 712 and attached to the latch 712 via a threaded connection.

In some embodiments, the plunger 722 might further include a second plunger end 726. The second plunger end 726 might partially extend through the opening 710 of the cap 708 of the latch housing 702. An anchor element 728 might be attached to the second plunger end 726 of the plunger 722. The anchor element 728 might have a circular shape which may be bigger than the circular opening 710 of the cap 708. Thus, the anchor element 728 might be configured to stop the second plunger end 726 from entering the latch housing 702. The anchor element 728 might further comprise a slot 730.

A cord 732 might loop and extend through the slot 730 of the anchor element 728. Two ends of the looped cord 732 might be attached together via one or more attachment mechanisms 734.

The latching mechanism 700 might also include a spring 736. The spring 736 might be wrapped around the plunger 722. By wrapping the spring 736 around the plunger 722, the spring 736 is less likely to deform and can more easily maintain its shape. In some cases, a first end of the spring 736 might be attached to the first end 724 of the plunger 722. A second end of the spring 736 may be in contact with an interior surface of the second end 706 of the housing 702 and/or an interior surface of the cap 708. When the spring 736 is uncompressed, the force of the spring 736 might cause an interior surface of the anchor element 728 to be in contact with an exterior surface of the second end 706 of the housing 702 and/or an interior surface of the cap 708.

In operation, in order to open a cover, the anchor element 728 may be pulled via the chord 732 which pulls the plunger 722 further out of the second end 706 of the housing 702 through the opening 710 of the cap 708, compresses the spring 736, and pulls the latch 712 into the open end 704 of the housing 702. This causes the latch 712 to disengage with a bottom surface of a side rail of a cover system. In order to close a cover, the latch 712 may be pushed down, causing the sloped surface 716 of the latch 712 to slide along a sloped surface of a side rail, pushing the latch 712 toward the second end 706 of the housing 702, compressing the spring 703, and pushing the plunger 722 further out of the opening 710 of the cap 708. Once the sloped surface 716 of the latch 712 clears the sloped surface of a side rail, the spring 736 uncompresses pushing the latch 712 and plunger 722 outward and away from the second end 706 of the housing 702 and enabling the latch 712 to releasably engage with a bottom surface of the side rail.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture, but instead can be implemented on any suitable hardware, firmware, and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A truck cover system, comprising:

a cover configured to cover a truck bed;

a side rail configured for mounting to a side wall of the truck bed, the side rail comprising a first top surface, a side surface configured as an angled surface, and a first inner surface configured substantially in parallel with the side wall of the bed of the truck;

a first connection plate extending from the side rail; and a second connection plate configured to slidingly engage with the first connection plate;

wherein the second connection plate is further configured to removably engage with the cover via a latching mechanism;

wherein the first connection plate is positioned on the second connection plate when the first connection plate engages with the second connection plate such that the second connection plate bears a weight of the first connection plate.

2. The truck cover system of claim 1, wherein the first connection plate comprises a first recess on a first bottom surface of the first connection plate and a second recess on a second top surface of the first connection plate.

3. The truck cover system of claim 2, wherein the second connection plate comprises a first protrusion configured to slidingly engage with the first recess of the first connection plate.

4. The truck cover system of claim 3, wherein the first protrusion of the second connection plate is configured as π-shaped.

5. The truck cover system of claim 3, wherein the second connection plate further comprises a second bottom surface configured to removably engage with the latching mechanism.

6. The truck cover system of claim 5, wherein the second bottom surface of the second connection plate is configured as higher than a bottom portion of the first protrusion.

7. The truck cover system of claim 3, wherein the first protrusion of the second connection plate comprises a third top surface, the third top surface is configured as an angled surface.

8. A truck cover system, the truck cover system comprising:

a side rail configured to be coupled to a side wall of a bed of a truck;

a cover removably attached to the side rail and configured to cover the bed of the truck;

a first connection plate extending from the side rail;

a second connection plate configured to disengageably couple to the first connection plate; and a latching mechanism coupled to the cover, the latching mechanism being configured to releasably engage the second connection plate;

wherein the latching mechanism comprises:

a latch housing attached to the cover and having a first open end and a second end;

a latch extending through the first open end of the latch housing and configured to releasably engage with a bottom portion of the side rail;

a cap having an opening and attached to the second end of the latch housing;

a plunger attached to the latch and having a first plunger end partially extending through the opening of the cap;

an anchor element attached to the first plunger end of the plunger and configured to stop the first plunger end from entering the latch housing; and a spring wrapped around the plunger, wherein a first spring end of the spring is in contact with an interior surface of the cap, wherein, when the spring is compressed, the latch disengages with the bottom portion of the side rail, and wherein, when the spring is uncompressed, the latch engages with the bottom portion of the side rail latching the cover in place; and wherein the latch is attached to the plunger via a threaded connection.

9. The truck cover system of claim 8, wherein a bottom surface of the latch is angled.

10. The truck cover system of claim 8, wherein the anchor element comprises a slot extending through the anchor element and wherein a cord extends through the slot of the anchor element.

11. The truck cover system of claim 10, wherein the cord is inserted through the slot of the anchor element to create a loop, and wherein the loop is tied via one or more attachment elements.

12. The truck cover system of claim 10, wherein pulling on the cord causes the plunger to move toward the cap of the latch housing, causes the spring to compress, and causes the latch to disengage with the bottom portion of the side rail, and wherein releasing the cord causes the plunger to move away from the cap of the latch housing, causes the spring to decompress, and causes the latch to engage with the bottom portion of the side rail.

13. The truck cover system of claim 10, wherein a first segment of the cord is threaded through the cover.

14. A truck cover system, the truck cover system comprising:

a side rail configured for mounting to a side wall of a truck bed;

a first connection plate extending from the side rail, the first connection plate comprising a first recess and a second recess;

a second connection plate configured to slidingly engage with the first connection plate, the second connection plate comprises a first protrusion and a third recess; and a connector configured to removably attach to the first connection plate and the second connection plate, the connector comprising a first prong and a second prong.

15. The truck cover system of claim 14, wherein:

the first prong of the connector is configured to removably engage with the second recess of the first connection plate; and the second prong of the connector is configured to removably engage with the third recess of the second connection plate.

16. The truck cover system of claim 14, wherein the connector is configured to removably couple a truck bed cover to the first connection plate and the second connection plate.

17. The truck cover system of claim 16, wherein the connector further comprises a gap located above the first connection plate such that the second connection plate distributes a force from the truck bed cover to the side rail when the truck bed cover is in a closed position.

18. The truck cover system of claim 14, further comprising a clamp configured to removably couple the second connection plate to the side rail.

19. The truck cover system of claim 18, wherein the clamp comprises a first clamp frame and a second clamp frame, the first clamp frame and the second clamp are configured to compressively hold the second connection plate and the side rail against the side wall of the truck bed.

* * * * *